(12) United States Patent
Abbott et al.

(10) Patent No.: US 11,226,923 B1
(45) Date of Patent: Jan. 18, 2022

(54) ONE WIRE POWER AND BI-DIRECTIONAL DATA INTERFACE FOR SERIAL COMMUNICATION

(71) Applicant: Endress+Hauser SE+Co. KG, Maulburg (DE)

(72) Inventors: Chris Abbott, Indianapolis, IN (US); Gautham Karnik, Whitestown, IN (US)

(73) Assignee: Endress+Hauser SE+Co. KG, Maulburg (DE)

(*) Notice: Subject to any disclaimer, the term of this patent is extended or adjusted under 35 U.S.C. 154(b) by 0 days.

(21) Appl. No.: 16/951,719

(22) Filed: Nov. 18, 2020

(51) Int. Cl.
  *G06F 13/42* (2006.01)
  *G06F 13/10* (2006.01)
  *H04L 5/14* (2006.01)

(52) U.S. Cl.
  CPC ........ *G06F 13/4291* (2013.01); *G06F 13/105* (2013.01); *H04L 5/14* (2013.01)

(58) Field of Classification Search
  None
  See application file for complete search history.

(56) References Cited

U.S. PATENT DOCUMENTS

| 2005/0134309 A1* | 6/2005 | Komatsu | H04L 25/028 326/47 |
| 2017/0025879 A1* | 1/2017 | Thompson | G06F 1/266 |

* cited by examiner

*Primary Examiner* — Scott C Sun
(74) *Attorney, Agent, or Firm* — Mark A. Logan; Endress+Hauser (USA) Holding Inc.

(57) ABSTRACT

A bidirectional serial communication interface comprising a slave powered by a master connected to the slave via a signal line and a return line is disclosed. The master includes a master switch inserted in a line connecting a supply voltage to the signal line and a transceiver transmitting binary signals by opening and closing the master switch and receiving binary signals whilst the master switch is open. The slave includes an energy storage charged via the signal line and providing an internal power supply; a pull-up switch inserted in a line connecting the signal line to the internal power supply; a pull-down switch inserted in a line connecting the signal line to the return line; and a transceiver transmitting binary signals by opening and closing the pull-up and the pull-down switch whilst the master switch is open and receiving binary signals whilst the pull-up and the pull-down switch are open.

15 Claims, 2 Drawing Sheets

ONE WIRE POWER AND BI-DIRECTIONAL DATA INTERFACE FOR SERIAL COMMUNICATION

TECHNICAL FIELD

The present disclosure relates to a bidirectional serial communication interface comprising a master and a slave powered by the master and connected to the master via a line system consisting of a single signal line and a return line connected to a reference potential, a method of operating this communication interface, and a field devices comprising this communication interface.

BACKGROUND

Bidirectional serial communication interfaces are applied in various applications. As an example, they are e.g. applied as internal interface within a field device. Field devices are devices operating in the field. As an example, field devices are applied in process automation technology to monitor, to regulate and/or to control operation of industrial sites, as well as to monitor, to regulate and/or to control at least one process, like e.g. a production process, performed at, on or by the industrial site. Field devices applied for this purpose comprise measurement devices measuring at least one variable, like e.g. pressure measurement devices, temperature measurement devices and flowmeters, as well as field devices comprising at least one actuator, like e.g. a valve or a stepper motor, embodied and/or applied to influence the operation of the site and/or the process.

Many field devices comprise a primary device, like e.g. a primary device comprising a main field device electronic, providing power to and communicating with a secondary device of the field device, like e.g. a secondary device comprising a sensor, a transducer or an actuator. To this extent the primary device and the secondary device are connected via a communication interface embodied to provide power from the primary device to the secondary device.

To achieve modularity enabling combining primary and secondary devices of different types, as well as to facilitate manufacturing modular communication interfaces comprising a set of connectors inserted in lines connecting a primary part of the interface to a secondary part of the interface can be applied.

Most bidirectional communication interfaces comprising a primary part providing power to the secondary part of the interface and enabling bidirectional communication require a set of at least four lines, each connecting a port of the primary part of the interface to a corresponding port of the secondary part of the interface. As an example, when universal asynchronous receiver transmitters (UART) are applied in both parts of the interface, two signal transmission lines, a power supply line and a return line are required. As another example, communication interfaces comprising an I2C bus require a signal transmission line, a clock signal line, a power supply line and a return line. As another example, communication interfaces comprising a master connected a slave via a serial peripheral interface (SPI) require a serial clock signal line, a signal transmission line connecting an output of the master to an input of the slave (MOSI), a signal transmission line connecting an input of the master to an output of the slave (MISO), a power supply line and a return line.

Due to progress achieved in technology, it has been possible to reduce the size of field device. In consequence less space is available to accommodate connectors connecting the two line segments of each of the lines connecting the primary part of the interface to the secondary part of the interface. Thus, the number of connectors corresponding to the number of lines required has become a limiting factor regarding further miniaturization of field devices.

The number of connectors can be reduced by applying a one-wire communication interface. An example is shown in FIG. 1. In this case, the primary part of the interface comprises a master M connected to a supply voltage Vc and the secondary part comprises a slave S comprising at least one capacitor C. Master M and slave S are connected via a one-wire communication bus consisting of a single signal line Ls connected to the supply voltage Vc and a return line Lr connected to a reference potential GND, like e.g. ground. In addition, a pull-up resistor R is inserted in an internal line Li connecting the supply voltage Vc to the signal line Ls. Both master M and slave S are embodied to transmit binary signals over the signal line Ls by driving a voltage on the signal line Ls down to a low voltage level corresponding to the reference potential GND and subsequently letting it rise to a high voltage level corresponding to the supply voltage Vc. To this extent, master M and slave S each comprise a switch Sm, Ss inserted in a connecting line Lcm, Lcs connecting the signal line Ls to the return line Lr and a transceiver TC-M, TC-S embodied to open and to close the respective switch Sm, Ss by providing a corresponding control signal to a control port of the respective switch Sm, Ss connected to a transmit port Tx of the respective transceiver TC-M, TC-S. Because each of the two switches Sm, Ss is connected in series to the pull-up resistor R, closing one of the switches Sm, Ss causes a current flowing through the pull up resistor R. This current causes the voltage on the signal line Ls to drop according to the voltage drop across the pull-up resistor R associated with the current.

Unfortunately, ensuring a voltage drop across the pull-up resistor R large enough to enable the master M and the slave S to communicate by driving the signal line Ls low requires for the pull-up resistor R to be rather large, e.g. in the order of 500Ω to 4000Ω. In consequence, shorting the supply voltage Vc to the reference potential GND via the pull-up resistor R by the master M closing the switch Sm, as well as by the slave S closing the switch Ss is each associated with a correspondingly high power loss.

Communication over the signal line Ls is controlled by the master M based on a communication protocol developed for one wire communication busses. Communication is started by the master M sending a reset pulse by pulling the signal line Ls low for a certain period of time, followed by a presence signal transmitted by the slave S indicating its presence. Following this the master M transmits at least one transmission signal, each representing a sequence of binary signals, wherein a binary 1 is transmitted by the master M pulling the signal line Ls low for a predetermined short time interval and a binary 0 is transmitted by the master M pulling the signal line Ls low for a predetermined longer time interval. The binary signals are received by the slave S by detecting a first point in time, when the voltage on the signal line Ls drops and reading the voltage at a second point in time, wherein the time difference between the first point in time and the second point in time is larger than the duration of the short time interval and shorter than the duration of the long time interval. Thus, a binary 0 is received, when the voltage is low at the second point in time and a binary 1 is received when the voltage is high at the second point in time. Transmission of a transmission signal comprising a sequence of binary signals from the slave S to the master M is performed bit by bit by the master M sending a start bit by pulling the signal line Ls low for a short period of time. Following each start bit, the slave S can either transmit a binary 0 by pulling the signal line Ls low for an additional time period or a binary 1 by not pulling the signal line low for the additional time period. The binary signal is received by the transceiver TC-M of the master M reading the voltage on the signal line Ls during the additional time period.

The capacitor C of the slave S is connected to the signal line Ls in parallel to the two switches Sm, Ss. Thus, the capacitor C is charged by the supply voltage Vc connected to the signal line Ls, when both switches Sm, Ss are open, and provides an internal power supply Vint to the slave S, when at least one of the two switches Sm, Ss is closed.

One-wire communication interfaces provide the advantage, that only two lines connecting the primary and the secondary part of the interface are required.

A disadvantage is however, that both voltage and current of the power provided from the master M to the slave S are limited due to the size of the pull-up resistor R. Another disadvantage is the energy wasted, each time the master M or the slave S drives the voltage on the signal line Ls low by shorting the supply voltage Vc to the reference potential GND via the pull-up resistor R. Both disadvantages result in a rather low energy efficiency of the communication interface. This is especially disadvantageous in applications, like e.g. in battery powered field devices, where only a limited amount of power is available to power the master M powering the slave S.

A further disadvantage is the comparatively low speed of communication. One reason for this is the communication protocol requiring a bit by bit transmission of binary signals from the slave S to the master M. In addition, in both communication directions an achievable data transmission rate is limited due to the rising time, required for the voltage on the signal line Ls to rise back up to the high voltage level each time the voltage on the signal line Ls has been pulled down to the low voltage level. This rising time is long due to the large size of the pull-up resistor R required and is further increased by the size of the capacity of the capacitor C.

Accordingly, there remains a need for further contributions in this area of technology.

As an example, there is a need for a communication interface comprising a master and a slave powered by the master and connected to the master via a line system consisting of a single signal line and a return line connected to a reference potential, having a higher energy efficiency and/or embodied to achieve a higher speed of communication.

SUMMARY

The present disclosure discloses a bidirectional serial communication interface comprising a master and a slave powered by the master and connected to the master via a line system consisting of a single signal line and a return line connected to a reference potential;

the master including: a master switch inserted in an internal line connecting a supply voltage to the signal line and a transceiver embodied to transmit binary signals to the slave by driving a voltage on the signal line by opening and closing the master switch according to the binary signals to be transmitted and embodied to receive binary signals transmitted by the slave whilst the supply voltage is disconnected from the signal line by the open master switch;

wherein the supply voltage is connected to the signal line without a pull-up resistor; the slave including:

at least one rechargeable energy storage connected to the signal line such, that it is charged via the signal line whilst the master switch is closed, and providing an internal power supply powering the slave whilst the master switch is open;

a switch system comprising a pull-up switch inserted in a first line connecting the signal line to the internal power supply and a pull-down switch inserted in a second line connecting the signal line to the return line; and a transceiver embodied, upon a request of the master, to transmit binary signals to the master whilst the master switch is open by driving the voltage on the signal line by opening and closing the pull-up switch and the pull-down switch according to the binary signals to be transmitted and embodied to receive binary signals transmitted by the master whilst the pull-up switch and the pull-down switch are open.

The communication interface provides the advantage that it is very energy efficient. In this respect, the absence of a pull-up resistor provides the advantage that no energy is wasted by currents flowing from the supply voltage through the pull-up resistor to the return line connected to the reference potential and that neither voltage nor current of the power supplied to the slave is limited by the pull-up resistor.

Another advantage is that the communication interface is embodied to perform bidirectional communication at a higher speed of communication than conventional one wire interfaces, like e.g. interfaces comprising a pull-up resistor. In this respect, the position and the operation of the master switch, the pull-up switch and the pull-down switch provide the advantage that following a request transmitted by the master, the slave is embodied to transmit binary signals to the master independently of the master. Thus, a bit by bit transmission of binary signals from the slave to the master is no longer required. Instead, the slave can transmit one or more data frames, each consisting of a series of one or more binary signal(s) in response to a single request issued by the master. In addition, the position and the operation of the master switch, the pull-up switch and the pull-down switch, as well as the absence of a pull-up resistor provide the advantage that during transmission of binary signals the changing times required to change the voltage level on the signal line from one of the two voltage levels to the other are extremely short.

In an embodiment, the transceiver of the master: includes a transmit port connected to a control port of the master switch; is embodied to provide a control signal to the control port of the master switch causing the master switch to open and to close according to this control signal; includes a receiving port connected to the internal line at a connecting point located between the master switch and the signal line; and is embodied to receive binary signals transmitted by the slave by reading the voltage on the signal line whilst the master switch is open.

In another embodiment, the transceiver of the slave: includes a first transmit port connected to a control port of the pull-up switch and a second transmit port connected to a control port of the pull-down switch; is embodied to provide a control signal to the control port of the pull-up switch causing the pull-up switch to open and to close according to this control signal and to provide a control signal to the control port of the pull-down switch causing the pull-down switch to open and to close according to this control signal; includes a receiving port connected to the signal line; and is embodied to receive binary signals transmitted by the master by reading the voltage on the signal line whilst the pull-up switch and the pull-down switch are open.

In another embodiment at least one of: the master switch, the pull-up switch and the pull-down switch is an electronically controllable switch or a switch comprising or consisting of at least one of: a transistor, a field effect transistor, an electromechanical relay and an electronically controllable switch circuitry; and/or an impedance or an impedance of 10KΩ to 100KΩ is inserted in the second line.

In another embodiment the slave includes a diode inserted in an internal line connecting the signal line to the energy storage.

In another embodiment the signal line and the return line each include a first line segment connected to the master, a second line segment connected to the slave and a connector connecting or releasably connecting the first line segment to the second line segment.

The present disclosure further comprises a method of operating the disclosed bidirectional serial communication interface, comprising the steps of: the master providing power to the slave; and the master initiating and controlling communication between the master and the slave.

In a first embodiment the method comprises the steps of at least once performing at least one of the steps of: a) powering on the slave; b) the master at least once transmitting at least one or more data frame(s) to the slave, each data frame including at least one binary signal or a sequence of binary signals; c) the slave at least once upon receipt of a request transmitted from the master to the slave transmitting at least one or more data frame(s) to the master, each data frame including at least one binary signal or a sequence of binary signals; d) powering off the slave; and e) powering the slave on when it is needed and subsequently powering the slave off again.

In an embodiment of the first embodiment powering on the slave: is performed by during at least one powering-on time period operating the communication interface in a powering mode, wherein the master switch is closed and both the pull-up switch and the pull-down switch are open; and/or comprises the step of the slave performing a startup routine started by the power supplied to the slave; and powering off the slave is performed by disconnecting the signal line from the supply voltage by opening the master switch.

In another embodiment of the first embodiment the master at least once transmitting at least one or more data frame(s) includes at least once performing at least one of the steps of: a) the master driving the voltage on the signal line according to the binary signals to be transmitted whilst the pull-up switch and the pull-down switch are both open and the slave is reading the voltage on the signal line; and b) the master transmitting each logic 0 to be transmitted to the slave by opening the master switch for a given time period and transmitting each logic 1 to be transmitted to the slave by closing the master switch for a given time period or vice versa; and the slave at least once upon receipt of a request transmitted from the master to the slave transmitting at least one or more data frame(s) to the master includes at least once performing the steps of: the master transmitting the request to the slave and subsequently disconnecting the supply voltage from the signal line by opening the master switch, and upon receipt of the request, the slave performing at least one of the steps of: a) the slave driving the voltage on the signal line according to the binary signals to be transmitted to the master whilst the master switch is open and the master is reading the voltage on the signal line; and b) the slave transmitting each logic 1 to be transmitted to the master by the slave connecting the signal line to the internal power supply of the slave by closing the pull-up switch for a given time period during which the pull-down switch is open and transmitting each logic 0 to be transmitted to the master by the slave connecting the signal line to the return line by closing the pull-down switch for a given time period during which the pull-up switch is open.

In another embodiment of the first embodiment the method comprises the step of at least once during at least one idle time interval, during which neither the master nor the slave is transmitting binary signals, operating the communication interface in a powering mode, wherein the master switch is closed and both the pull-up switch and the pull-down switch are open.

The present disclosure further comprises a field device comprising the disclosed bidirectional serial communication interface, the field device comprising: a primary part including a field device electronic, wherein the primary part includes or is connected to the master of the communication interface; and a secondary part including or connected to the slave of the communication interface; wherein the secondary part includes at least one secondary device or at least one of: a sensor, a sensor electronic connected to a sensor, a transducer, an actuator and at least one other secondary device.

In an embodiment of the field device the secondary part, at least the slave or the slave and at least one of: at least one secondary device, a sensor, a sensor electronic connected to a sensor, a transducer and an actuator connected to the slave is powered via the communication interface.

In another embodiment of the field device the field device or at least the communication interface is a battery powered device or a solar powered device; and/or the field device includes at least one battery including at least one disposable battery element, at least one rechargeable battery element and/or at least one battery element charged by a solar power collector connected to the battery.

In another embodiment of the field device the primary part is connected to the secondary part via the signal line and the return line, each including a first line segment, a second line segment and a connector connecting or releasably connecting the first line segment to the second line segment.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken injunction with the accompanying drawings, wherein.

DETAILED DESCRIPTION

Figure 2:
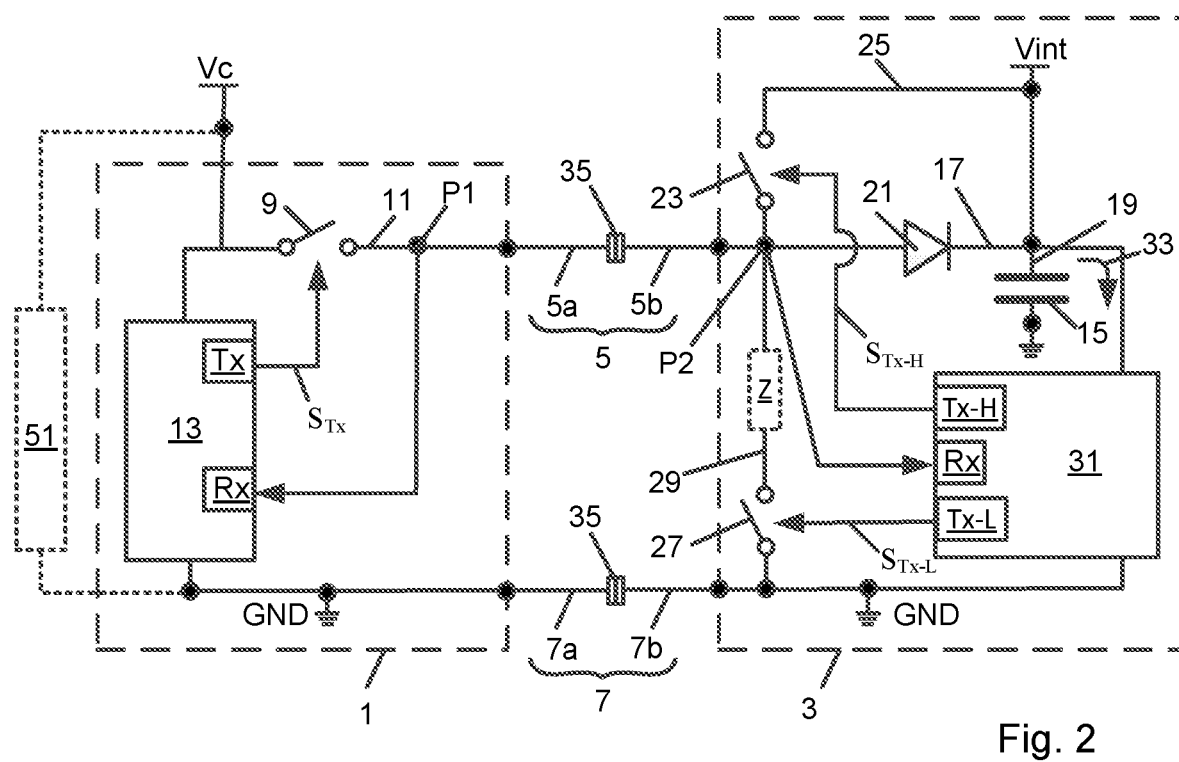
FIG. 2 shows a bidirectional serial communication interface.

The present disclosure includes a bidirectional serial communication interface, a method of operating this communication interface and a field device comprising this communication interface. FIG. 2 shows an example of the bidirectional serial communication interface comprising a master 1 and a slave 3. The slave 3 is powered by the master 1 and connected to the master 1 via a line system consisting of a single signal line 5 and a return line 7 connected to a reference potential GND, like e.g. ground, earth or an internal reference potential of the master 1.

The master 1 is embodied to initiate and to control communication between the master 1 and the slave 3 and to provide power to the slave 3. To this extent, the master 1 comprises a master switch 9 inserted in an internal line 11 connecting a supply voltage Vc to the signal line 5 and a transceiver 13.

Figure 1:
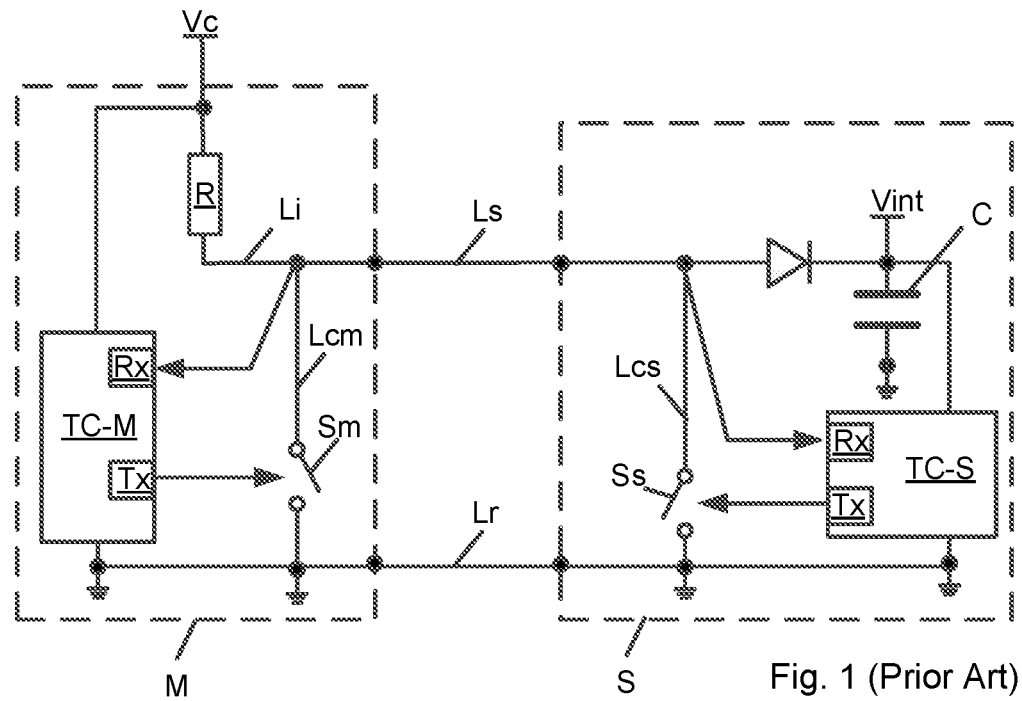
FIG. 1 shows a one wire communication interface according to the state of the art.

In difference to the conventional one-wire communication interfaces, like e.g. the interface shown in FIG. 1, the supply voltage Vc is connected to the signal line 5 without a pull-up resistor. Thus, energy losses caused by currents flowing through a pull-up resistor are avoided.

The transceiver 13 of the master 1 is embodied to transmit binary signals to the slave 3 by opening and closing the master switch 9 according to the binary signals to be transmitted and embodied to receive binary signals transmitted by the slave 3, whilst the voltage supply Vc is disconnected from the signal line 5 by the open master switch 9.

In the example shown in FIG. 2 a transmit port Tx of the transceiver 13 of the master 1 is connected to a control port of the master switch 9. Via the transmit port Tx, the transceiver 13 of the master 1 provides a control signal $S_{Tx}$ to the control port of the master switch 9 causing the master switch 9 to open and to close according to the control signal $S_{Tx}$ provided to its control port.

The master switch 9 is e.g. an electronically controllable switch, like e.g. a switch including or consisting of at least one of: a transistor, a field effect transistor, an electromechanical relay and an electronically controllable switch circuitry, having a control port, like e.g. a gate, and embodied to be opened and closed by the control signal $S_{T}x$.

When the master switch 9 is closed, the signal line 5 is connected to the supply voltage Vc and the voltage on the signal line 5 is at a high voltage level corresponding to the supply voltage Vc. When the master switch 9 is open, the signal line 5 is disconnected from the supply voltage Vc. Disconnecting the signal line 5 from the supply voltage Vc causes the voltage on the signal line to drop to a low voltage level. This voltage drop is caused by a current consumed by the slave 3. Thus, the transceiver 13 of the master 1 is able to drive the voltage on the signal line 5 by opening and closing the master switch 9. By opening and closing the master switch 9 accordingly, binary signals having two distinguishable levels given by the high voltage level and the low voltage level can be transmitted from the master 1 to the slave 3 via the signal line 5.

In difference to the communication interface shown in FIG. 1, the master 1 driving the voltage on the signal line 5 to the low voltage level does not require shorting the supply voltage Vc to the reference potential GND across a pull-up resistor. Thus, energy losses associated with this form of short circuiting, as well as energy losses associated with a current flowing through a pull-up resistor are avoided. Instead, the current associated with the master 1 driving the signal line 5 to the high voltage level, as well as the current consumed by the slave 3 causing the voltage level to drop to the low level when the master switch 9 is opened both provide power to the slave 3.

Another advantage is, that due to the position of the master switch 9 and the absence of a pull-up resistor, a voltage level changing time required for the master 1 to change the voltage level on the signal line 5 from the high voltage level to the low voltage level and vice versa are very short. In consequence, correspondingly high binary signal transmission rates can be achieved.

As shown in FIG. 2, the transceiver 13 of the master 1 e.g. further comprises a receiving port Rx connected to the internal line 11 at a connecting point P1 located between the master switch 9 and the signal line 5. In this example, the transceiver 13 is e.g. embodied to receive binary signal transmitted by the slave 3 over the signal line 5 whilst the master switch 9 is open by reading a voltage imposed on the signal line 5 by the slave 3 driving the voltage on the signal line 5.

As an option, the master 1 is powered by the supply voltage Vc. In that case the transceiver 13 of the master 1 is connected to the supply voltage Vc and to the return line 7.

The slave 3 is powered by the master 1. To this extent, the slave 3 comprises at least one rechargeable energy storage 15 connected to the signal line 5 such, that the energy storage 15 is charged by the supply voltage Vc connected to the signal line 5 whilst the master switch 9 is closed, and such that energy stored in the energy storage 15 provides an internal power supply Vint for the slave 3 whilst the supply voltage Vc is disconnected from the signal line 5 by the open master switch 9.

The energy storage 15 is e.g. a capacitor or a rechargeable energy storage comprising at least one capacitor. In the example shown, the slave 3 comprises an internal line 17 connected to the signal line 5 and the energy storage 15 comprises a single capacitor inserted in a connecting line 19 of the slave 3 connecting the internal line 17 of the slave 3 to the return line 7 or an internal reference potential of the slave 3 connected to the return line 7. As an alternative, two or more capacitors connected in parallel to each other can be inserted in the connecting line 19. As another alternative, another type of rechargeable energy storage, like e.g. an energy storage comprising at least one rechargeable battery, can be applied instead of the capacitor shown in FIG. 2 and/or in the same position as the capacitor shown.

In either case, the energy storage 15 is charged by a current flowing from the supply voltage Vc along the signal line 5 to the energy storage 15 and discharged by a current withdrawn from the energy storage 15 by the slave 3. As an option energy stored in the energy storage 15 may also be provided to at least one or more additional components connected to the slave 3.

To avoid that the energy storage 15 can be discharged along the signal line 5, a diode 21 is inserted in the internal line 17 connecting the signal line 5 to the connecting line 19 comprising the energy storage 15.

With respect to the power supplied by the master 1 to the slave 3, the absence of a pull-up resistor inserted in the internal line 11 connecting the supply voltage Vc to the signal line 5 and thus to the slave 3, provides the advantage that neither voltage nor current of the power provided to the slave 3 via the signal line 5 is limited due to the size of the pull-up resistor, and that energy losses associated with a current flowing through the pull-up resistor are avoided.

The slave 3 includes a switch system enabling the slave 3 to drive the voltage on the signal line 5 to a high voltage level by connecting the signal line 5 to the internal power supply Vint and to drive the voltage on the signal line 5 to a low voltage level by connecting the signal line 5 to the return line 7 whilst the supply voltage Vc is disconnected from the signal line 5 by the open master switch 9.

As shown in FIG. 2 the switch system e.g. comprises a pull-up switch 23 inserted in a first line 25 connecting the signal line 5 to the internal power supply Vint and a pull-down switch 27 inserted in a second line 29 connecting the signal line 5 to the return line 7.

As an option indicated by dotted lines in FIG. 2 an electrical impedance Z, e.g. an impedance of 10KΩ to 100KΩ, like e.g. a resistor of corresponding size, is e.g. inserted in the second line 29. This impedance Z provides the advantage that energy consumptions associated with connecting the signal line 5 to the return line 7 by closing the pull-down switch 27 are reduced.

As an option, the first line 25 connecting the signal line 5 to the internal power supply Vint and the second line 29 connecting the signal line 5 to the return line 7 are each connected to the internal line 17 of the slave 3 at a connecting point P2 located between the diode 21 preceding the connecting line 19 comprising the energy storage 15 and the signal line 5.

The slave 3 further comprises a transceiver 31 embodied to upon receipt of a request of the master 1 transmit binary signals to the master 1 by opening and closing the pull-up switch 23 and the pull-down switch 27 according to the binary signals to be transmitted whilst the master switch 9 is open.

To this extent, the transceiver 31 of the slave 3 e.g. comprises a first transmit port $T_{X-H}$ connected to a control port of the pull-up switch 23 and a second transmit port $T_{X-L}$ connected to a control port of the pull-down switch 27. Via the first transmit port $T_{X-H}$ the transceiver 31 provides a control signal $S_{Tx-H}$ to the control port of the pull-up switch 23 causing the pull-up switch 23 to open and to close according to the control signal $S_{Tx-H}$ provided to its control port. Via the second transmit port $T_{X-L}$, the transceiver 31 provides a control signal $S_{Tx-L}$ to the control port of the pull-down switch 27 causing the pull-down switch 27 to open and to close according to the control signal $S_{Tx-L}$ provided to its control port.

Just like the master switch 9, the pull-up switch 23 and the pull-down switch 27 are e.g. electronically controllable switches, like e.g. switches including or consisting of at least one of: a transistor, a field effect transistor, an electromechanical relay and an electronically controllable switch circuitry, each having a control port, e.g. a gate, and embodied to be opened and closed by the control signal $S_{Tx-H}$, $S_{Tx-L}$.

Whilst the signal line 5 is disconnected from the supply voltage Vc by the open master switch 9, the transceiver 31 of the slave 3 can drive the voltage on the signal line 5 to a high voltage level corresponding to the internal power supply Vint by providing control signals $S_{Tx-H}$, $S_{Tx-L}$ closing the pull-up switch 23 and opening the pull-down switch 27. Whilst the master switch 9 is open, the pull-up switch 23 is closed and the pull-down switch 27 is open, the signal line 5 is connected to the internal power supply Vint of the slave 3 via the closed pull-up switch 23 and disconnected from the return line 7 by the open pull-down switch 27.

Whilst the signal line 5 is disconnected from the supply voltage Vc by the open master switch 9, the transceiver 31 of the slave 3 can drive the voltage on the signal line 5 to a low voltage level corresponding to the reference potential GND by providing control signals $S_{Tx-H}$, $S_{Tx-L}$ opening the pull-up switch 23 and closing the pull-down switch 27. Whilst the master switch 9 is open, the pull-up switch 23 is open and the pull-down switch 27 is closed, the signal line 5 is connected to the return line 7 connected to the reference potential GND via the closed pull-down switch 27 and disconnected from the internal power supply Vint by the open pull-up switch 23.

The transceiver 31 of the slave 3 is further embodied to receive binary signals transmitted by the master 1 via the signal line 5 whilst the pull-up switch 23 and the pull-down switch 27 are both open. To this extent, the transceiver 31 of the slave 3 e.g. comprises a receiving port Rx connected to the signal line 5. As an option, the receiving port Rx is e.g. connected to the internal line 17 of the slave 3 connected to the signal line 5 at connecting point P2 located between the diode 21 preceding the connecting line 19 comprising the energy storage 15 and the signal line 5. The transceiver 31 of the slave 3 is e.g. embodied to receive binary signals transmitted by the master 1 over the signal line 5 whilst the pull-up switch 23 and the pull-down switch 27 are both open by reading the voltage imposed on the signal line 5 by the master 1 driving the voltage on the signal line 5.

As indicated by the curved arrow 33 shown in FIG. 2, the transceiver 31 of the slave 3 is powered by the internal power supply Vint provided by the energy storage 15, when the signal line 5 is disconnected from the supply voltage Vc by the open master switch 9. To this extent, the transceiver 31 is e.g. connected in parallel to the energy storage 15 to the signal line 5 and to the return line 7 and in series to the diode 21.

The communication interface provides the advantages mentioned above. Individual parts of the communication interface can be implemented in different ways without deviating from the scope of the invention.

As an option, the communication interface is embodied as a modular interface comprising a primary interface part comprising the master 1, a secondary interface part comprising the slave 3 and the line system connecting the master 1 to the slave 3.

As an additional or alternative option, both, the signal line 5 and the return line 7 each comprise a first line segment 5a, 7a connected to the master 1, a second line segment 5b, 7b connected to the slave 3 and a connector 35 connecting the first line segment 5a, 7a to the second line segment 5b, 7b. As an option, the connectors 35, are e.g. connectors, like e.g. connectors comprising a male and a female part, releasably connecting the first line segments 5a, 7a to the second line segment 5b, 7b of the respective line.

The present disclosure further includes a method of operating the communication interface comprising the steps of: the master 1 providing power to the slave 3 and the master 1 initiating and controlling communication between the master 1 and the slave 3.

Due to the design of the communication interface providing the advantages above, this method is very energy efficient and provides high communication speed. As an example, during communication a data transmission rate of 9600 bits per second to 256000 bits per second can be achieved.

Individual steps of the method can be implemented in different ways without deviating from the scope of the invention.

As an option, the method of operating the bidirectional serial communication interface comprises the steps of at least once performing at least one of the steps of:

a) powering on the slave 3;

b) the master 1 at least once transmitting at least one data frame, each data frame including at least one binary signal or a sequence of binary signals, to the slave 3;

c) the slave 3 at least once upon receipt of a request transmitted from the master 1 to the slave 3 transmitting at least one data frame, each data frame including at least one binary signal or a sequence of binary signals, to the master 1; and d) powering off the slave 3.

Powering on the slave 3 is e.g. performed by during at least one powering-on time period operating the communication interface in a powering mode, wherein the master switch 9 is closed and both the pull-up switch 23 and the pull-down switch 27 are open. Thus, in the powering mode power provided by the supply voltage Vc is provided from the master 1 to the slave 3 connected to the supply voltage Vc via the closed master switch 9 and the signal line 5.

Operating the communication interface in the powering mode is e.g. performed by the transceiver 13 of the master 1 supplying the control signal $S_{Tx}$ to the control port of the master switch 9 such, that the master switch 9 is closed during each powering-on time period.

To avoid short circuiting, the pull-down switch 27 and the pull-up switch 23 are both open during each powering-on time period during which the communication interface is operated in the powering mode. This is e.g. achieved by the slave 3 having a default state, wherein both the pull-up switch 23 and the pull-down switch 27 are open.

Powering on the slave 3 e.g. comprises a method step, during which the slave 3 performs a startup routine started by the power supplied to the slave 3.

Unless the energy storage 15 is already fully charged at the beginning of the powering-on time period, the energy storage 15 is charged or recharged by the current supplied to the energy storage 15 via the signal line 5 during operation of the communication interface in the powering mode.

Regardless of the state of charge of the energy storage 15, the communication interface, in particular the absence of a pull-up resistor, provides the advantage that the power supplied to the slave 3 is essentially only limited by the capabilities of the master switch 9 and the diode 21 preceding the energy storage 15 and the transceiver 31 of the slave 3.

Once the slave 3 has been powered on, the communication interface can be operated in a communication mode, wherein communication is initiated and controlled by the master 1.

Communication is e.g. performed according to a predefined communication protocol including the step of the master 1 at least once transmitting at least one data frame to the slave 1, each data frame comprising at least one binary signal or a sequence of binary signals.

Transmitting the data frames from the master 1 to the slave 3 is e.g. performed by the master 1 driving the voltage on the signal line 5 according to the binary signals to be transmitted whilst the pull-up switch 23 and the pull-down switch 27 are both open and the receiving port Rx of the transceiver 31 of the slave 3 is enabled. As an example, a logic 0 is e.g. transmitted by opening the master switch 9 for a given time period and a logic 1 is transmitted by closing the master switch 9 for a given time period or vice versa. This causes the voltage on the signal line 5 to vary in time according to the binary signals transmitted.

Figure 3:
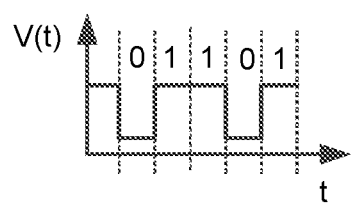
FIG. 3 shows a voltage on the signal line shown in FIG. 2 as a function of time during transmission of a data frame.

As an example FIG. 3 shows the voltage V(t) on the signal line 5 as a function of time t during transmission of a data frame comprising the sequence [0, 1, 1, 0, 1] of binary signals, in an embodiment, wherein the logic 1 is represented by the high voltage level. As an option, each data frame e.g. comprises a start bit, like e.g. a logic 0, preceding the first or the only binary signal to be transmitted.

Each data frame transmitted by the master 1 is received by the slave 3 reading the voltage V(t) on the signal line 5 connected to the enabled receiving port Rx of the transceiver 31 of the slave 3.

Communication in the opposite direction, namely from the slave 3 to the master 1, is e.g. performed by the master 1 transmitting a request to the slave 3 and subsequently disconnecting the supply voltage Vc from the signal line 5 by opening the master switch 9. Upon receipt of the request, the slave 3 then transmits at least one or more data frame(s) to the master 1 whilst the master switch 9 is open and the receiving port Rx of the transceiver 13 of the master 1 is enabled.

As an example, a logic 1 is e.g. transmitted from the slave 3 to the master 1 by the slave 3 connecting the signal line 5 to the internal power supply Vint of the slave 3 by closing the pull-up switch 23 for a given time period during which the pull-down switch 27 is open. Correspondingly a logic 0 is e.g. transmitted from the slave 3 to the master 1 by the slave 3 connecting the signal line 5 to the return line 7 by closing the pull-down switch 27 for a given time period during which the pull-up switch 23 is open. This causes the voltage V(t) on the signal line 5 driven by the slave 3 to vary in time according to the binary signals transmitted in the same way as illustrated in FIG. 3 showing an example of the voltage V(t) on the signal line 5 driven by the master 1.

Each data frame transmitted from the slave 3 to the master 1 comprises one binary signal or a sequence of binary signals. As an option, each data frame transmitted from the slave 3 to the master 1 e.g. comprises an additional start bit, like e.g. a logic 0, preceding the at least one binary signal to be transmitted.

Regardless of whether the data frames comprise the start bit or not, each data frame transmitted by the slave 3 is received by the master 1 reading the voltage V(t) on the signal line 5 connected to the enabled receiving port Rx of the transceiver 13 of the master 1.

As an option the communication interface is e.g. operated in the powering mode during at least one idle time interval during which neither the master 1 nor the slave 3 is transmitting binary signals. In that case, the master switch 9 is closed and both the pull-up switch 23 and the pull-down switch 29 are open during the respective idle time interval.

Regardless of whether the powering mode is applied during at least one powering-on time interval and/or during at least one idle time interval, as an option, the receiving port Rx of the transceiver 13 of the master 1 and/or the receiving port Rx of the transceiver 31 of the slave 3 are e.g. disabled whilst the communication interface is operated in the powering mode.

Powering off the slave 3 is e.g. performed by disconnecting the signal line 5 from the supply voltage Vint by opening the master switch 9. In this case the open master switch 9 cuts the slave 3 off the power supply and thus causes the slave 3 to turn off.

In comparison to the conventional communication interface shown in FIG. 1, powering off the slave 3 by opening the master switch 9 provides the advantage, that there is no need to short the signal line 5 to the reference potential GND. Thus, essentially no energy is wasted by powering off the slave 3.

In difference to the communication interface shown in FIG. 1, the communication interface described herein based on the example shown in FIG. 2 provides the advantage that the slave 3 does not have to be powered on all the time. Instead, as an option, the communication interface is e.g. operated such, that the slave 3 is powered on when it is needed and subsequently powered off again. This makes the operation of the communication interface even more energy efficient.

The communication interface, as well as the method of operating the communication interface disclosed can be applied in various applications.

Figure 4:
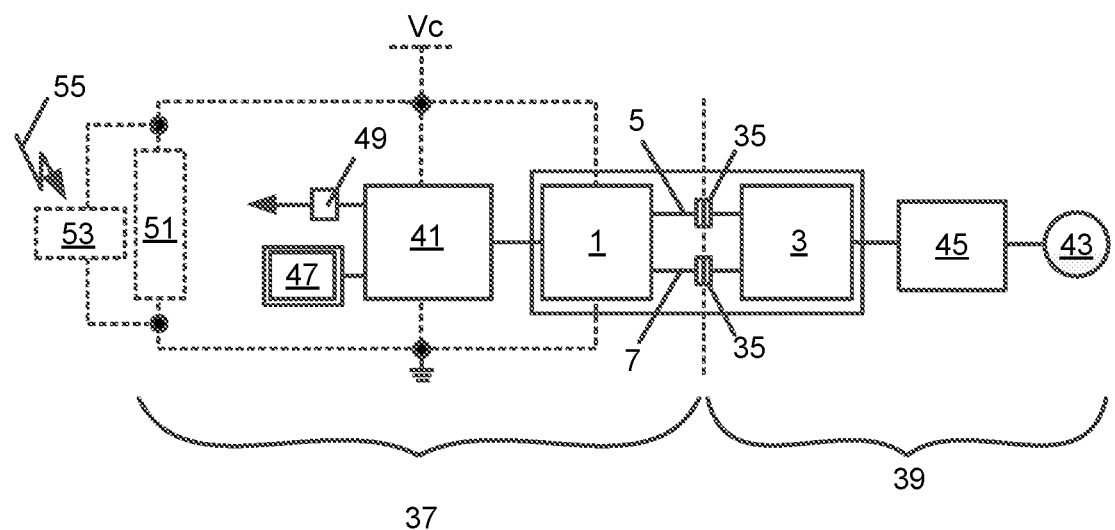
FIG. 4 shows a field device comprising the communication interface shown in FIG. 2.

As an example, FIG. 4 shows a field device comprising the communication interface disclosed herein. The field device is e.g. a field device that can be used in automation technology, like e.g. a measurement device measuring at least one variable, like e.g. a pressure measurement device, a temperature measurement device or a flowmeter, or a field device comprising at least one actuator, like e.g. a valve or a stepper motor.

The field device shown in FIG. 4 comprises a primary part 37 including or connected to the master 1 of the communication interface and a secondary part 39 including or connected to the slave 3 of the communication interface. As shown, the primary part 37 and the secondary part 39 of the field device are connected via the line system consisting of the single signal line 5 and the return line 7 connecting the master 1 to the slave 3.

As an option, the primary part 37 e.g. includes a field device electronic 41 connected to the master 1 and the secondary part 39 e.g. comprises at least one secondary device, like e.g. a sensor, a transducer, an actuator and/or at least one other secondary device.

In the example shown in FIG. 4, the secondary part 39 comprises a sensor 43 measuring a variable, e.g. a pressure sensor measuring a pressure, a temperature sensor measuring a temperature or a pH-sensor measuring a pH-value. The sensor 43 is connected to a sensor electronic 45, like e.g. a sensor electronic 45 generating, amplifying and/or processing a measurement signal representing the variable measured by the sensor 43 and/or determining and providing measured values of the variable measured by the sensor 43. In this embodiment, the communication interface is e.g. applied to transmit measured values measured by the sensor 43 to the field device electronic 41. As an option the field device electronic 41 is e.g. embodied to process the measured values and to determine and/or to provide a corresponding measurement result. In this case, the measurement result is e.g. displayed on a display 47 of the field device and/or provided in form of a corresponding measurement signal via an output 49 of the field device. As an option the output 49 is e.g. a signal output connected to or connectable to a superordinate unit, like e.g. a process control system or a programmable logical controller, an output comprising a bus interface connectable to or connected to a bus system, like e.g. bus system embodied to communicate over a pair of lines additionally providing an analog signal in form of a current varying between 4 mA and 20 mA according to the Highway Addressable Remote Transducer Communication Protocol (HART), or an output comprising a wireless transmitter or transceiver wirelessly transmitting the measurement result provided by the field device.

As an option, the entire secondary part 39, at least the slave 3 or the slave 3 and at least one of the secondary devices of the secondary part 39 connected to the slave 1, like e.g. the sensor electronic 45 and/or the sensor 43 shown in FIG. 4, are powered by the primary part 37 of the field device via the communication interface.

As an additional or alternative option, the field device is e.g. a modular device. In this case, the communication interface is e.g. a modular interface, comprising the connectors 35 described above connecting or releasably connecting the master 1 and the slave 3. This is especially advantageous when a family of field devices is manufactured, wherein the same primary part 37 can be combined with secondary parts 39 of different types or vice versa. As an example, the primary part 37 comprising a specific type of field device electronic 41 can e.g. be combined with secondary parts 39 of different types, like e.g. secondary parts 39 comprising sensors 43 having different measurement ranges. As a further example, different primary parts 37, like e.g. primary parts 37 having different types of outputs 49 and/or displays 47 can be combined with secondary parts 39 of the same type, like e.g. secondary parts 39 comprising a specific type of sensor 43.

As another additional or alternative option, the field device is e.g. a battery powered device comprising at least one battery 51, like e.g. a battery consisting of a single battery element or a battery consisting of a battery pack including at least two battery elements. As an example the at least one battery 51 e.g. comprises at least one disposable battery element, at least one rechargeable battery element and/or at least one battery element charged by a solar power collector 53 connected to the battery 51. In this case, at least one component of the field device is powered by the battery 51.

As an option, the entire field device or at least the communication interface can be powered by the at least one battery 51. This is illustrated in FIG. 2, wherein the optional battery 51 providing the supply voltage Vc is indicated by dotted lines, and in FIG. 4 showing the optional battery 51 indicated by dotted lines in combination with the optional solar power collector 53 exposed to sunlight indicated by the arrow 55.

With respect to the limited power available in entirely or at least partially solar and/or battery powered field devices, the high energy efficiency and the correspondingly low power consumption of the communicating interface provides the advantage, that it reduces the energy consumption of the field device and thus allows for these field devices to be operated for a longer time.

The invention claimed is:

1. A bidirectional serial communication interface, comprising:
a master and a slave powered by the master and connected to the master via a line system including a single signal line and a return line connected to a reference potential;
wherein the master includes a master switch inserted in an internal line connecting a supply voltage to the signal line and a transceiver embodied to transmit binary signals to the slave by driving a voltage on the signal line by opening and closing the master switch according to the binary signals to be transmitted and embodied to receive binary signals transmitted by the slave whilst the supply voltage is disconnected from the signal line by the open master switch,
wherein the supply voltage is connected to the signal line without a pull-up resistor,
wherein the slave includes:
a rechargeable energy storage connected to the signal line such that the rechargeable energy storage is charged via the signal line whilst the master switch is closed, and the rechargeable energy storage provides an internal power supply powering the slave whilst the master switch is open;
a switch system including a pull-up switch inserted in a first line connecting the signal line to the internal power supply and a pull-down switch inserted in a second line connecting the signal line to the return line; and
a transceiver embodied, upon a request of the master, to transmit binary signals to the master whilst the master switch is open by driving the voltage on the signal line by opening and closing the pull-up switch and the pull-down switch according to the binary signals to be transmitted and further embodied to receive binary signals transmitted by the master whilst the pull-up switch and the pull-down switch are open.

2. The bidirectional serial communication interface of claim 1, wherein the transceiver of the master:
includes a transmit port connected to a control port of the master switch;
is embodied to provide a control signal to the control port of the master switch causing the master switch to open and to close according to this control signal;
includes a receiving port connected to the internal line at a connecting point located between the master switch and the signal line; and
is embodied to receive binary signals transmitted by the slave by reading the voltage on the signal line whilst the master switch is open.

3. The bidirectional serial communication interface of claim 1, wherein the transceiver of the slave:
includes a first transmit port connected to a control port of the pull-up switch and a second transmit port connected to a control port of the pull-down switch;
is embodied to provide a control signal to the control port of the pull-up switch causing the pull-up switch to open and to close according to this control signal and to provide a control signal to the control port of the pull-down switch causing the pull-down switch to open and to close according to this control signal;
includes a receiving port connected to the signal line; and
is embodied to receive binary signals transmitted by the master by reading the voltage on the signal line whilst the pull-up switch and the pull-down switch are open.

4. The bidirectional serial communication interface of claim 1, wherein:
at least one of: the master switch, the pull-up switch, and the pull-down switch is an electronically controllable switch or a switch including a transistor, a field effect transistor, an electromechanical relay, or an electronically controllable switch circuitry; and
an impedance is inserted in the second line.

5. The bidirectional serial communication interface of claim 1, wherein the slave further includes a diode inserted in an internal line connecting the signal line to the energy storage.

6. The bidirectional serial communication interface of claim 1, wherein the signal line and the return line each include a first line segment connected to the master, a second line segment connected to the slave, and a connector connecting or releasably connecting the first line segment to the second line segment.

7. A method of operating a bidirectional serial communication interface, comprising:
providing the bidirectional serial communication interface, including:
a master and a slave powered by the master and connected to the master via a line system including a single signal line and a return line connected to a reference potential;
wherein the master includes a master switch inserted in an internal line connecting a supply voltage to the signal line and a transceiver embodied to transmit binary signals to the slave by driving a voltage on the signal line by opening and closing the master switch according to the binary signals to be transmitted and further embodied to receive binary signals transmit-
ted by the slave whilst the supply voltage is disconnected from the signal line by the open master switch;
wherein the supply voltage is connected to the signal line without a pull-up resistor;
wherein the slave includes a rechargeable energy storage connected to the signal line such that the rechargeable energy storage is charged via the signal line whilst the master switch is closed, and the rechargeable energy storage provides an internal power supply powering the slave whilst the master switch is open;
wherein the slave further includes a switch system including a pull-up switch inserted in a first line connecting the signal line to the internal power supply and a pull-down switch inserted in a second line connecting the signal line to the return line; and
wherein the slave further includes a transceiver embodied, upon a request of the master, to transmit binary signals to the master whilst the master switch is open by driving the voltage on the signal line by opening and closing the pull-up switch and the pull-down switch according to the binary signals to be transmitted and further embodied to receive binary signals transmitted by the master whilst the pull-up switch and the pull-down switch are open;
providing power from the master to the slave; and
the master initiating and controlling communication between the master and the slave.

8. The method of claim 7, further comprising:
powering on the slave;
the master transmitting one or more data frames to the slave, each data frame including at least one binary signal or a sequence of binary signals;
the slave at least once upon receipt of a request transmitted from the master to the slave transmitting at least one or more data frames to the master, each data frame including at least one binary signal or a sequence of binary signals;
powering off the slave; and
powering the slave on when it is needed and subsequently powering the slave off again.

9. The method of claim 8, wherein:
powering on the slave is performed by, during at least one powering-on time period, operating the communication interface in a powering mode, wherein the master switch is closed and both the pull-up switch and the pull-down switch are open and includes the slave performing a startup routine started by the power supplied to the slave; and
powering off the slave is performed by disconnecting the signal line from the supply voltage by opening the master switch.

10. The method of claim 8,
wherein the master transmitting one or more data frames includes:
the master driving the voltage on the signal line according to the binary signals to be transmitted whilst the pull-up switch and the pull-down switch are both open and the slave is reading the voltage on the signal line; and
the master transmitting each logic 0 to be transmitted to the slave by opening the master switch for a given time period and transmitting each logic 1 to be transmitted to the slave by closing the master switch for a given time period or vice versa, and wherein the slave, upon receipt of a request transmitted from the master to the slave, transmitting one or more data frames to the master includes:
the master transmitting the request to the slave and subsequently disconnecting the supply voltage from the signal line by opening the master switch, and
upon receipt of the request, the slave performing at least one of the steps of:
the slave driving the voltage on the signal line according to the binary signals to be transmitted to the master whilst the master switch is open and the master is reading the voltage on the signal line; and
the slave transmitting each logic 1 to be transmitted to the master by the slave connecting the signal line to the internal power supply of the slave by closing the pull-up switch for a given time period during which the pull-down switch is open and transmitting each logic 0 to be transmitted to the master by the slave connecting the signal line to the return line by closing the pull-down switch for a given time period during which the pull-up switch is open.

11. The method of claim 8, further comprising:
operating the communication interface in a powering mode in which the master switch is closed and both the pull-up switch and the pull-down switch are open, during at least one idle time interval during which neither the master nor the slave is transmitting binary signals.

12. A field device, comprising:
a bidirectional serial communication interface, including:
a master and a slave powered by the master and connected to the master via a line system including a single signal line and a return line connected to a reference potential;
the master including: a master switch inserted in an internal line connecting a supply voltage to the signal line and a transceiver embodied to transmit binary signals to the slave by driving a voltage on the signal line by opening and closing the master switch according to the binary signals to be transmitted and embodied to receive binary signals transmitted by the slave whilst the supply voltage is disconnected from the signal line by the open master switch;
wherein the supply voltage is connected to the signal line without a pull-up resistor;
the slave including:
a rechargeable energy storage connected to the signal line such that the rechargeable energy storage is charged via the signal line whilst the master switch is closed, and the rechargeable energy storage provides an internal power supply powering the slave whilst the master switch is open;
a switch system including a pull-up switch inserted in a first line connecting the signal line to the internal power supply and a pull-down switch inserted in a second line connecting the signal line to the return line; and
a transceiver embodied, upon a request of the master, to transmit binary signals to the master whilst the master switch is open by driving the voltage on the signal line by opening and closing the pull-up switch and the pull-down switch according to the binary signals to be transmitted and further embodied to receive binary signals transmitted by the master whilst the pull-up switch and the pull-down switch are open;
a primary part including a field device electronic, wherein the primary part includes or is connected to the master of the communication interface; and
a secondary part including or connected to the slave of the communication interface, wherein the secondary part includes at least one secondary device or at least one of: a sensor, a sensor electronic connected to a sensor, a transducer, an actuator and at least one other secondary device.

13. The field device of claim 12, wherein: the secondary part, at least the slave or the slave and at least one of: at least one secondary device, a sensor, a sensor electronic connected to a sensor, a transducer, and an actuator connected to the slave is powered via the communication interface.

14. The field device of claim 12, wherein:
wherein the field device or at least the communication interface is a battery powered device or a solar powered device, and
wherein the field device includes at least one battery including at least one disposable battery element, at least one rechargeable battery element and/or at least one battery element charged by a solar power collector connected to the battery.

15. The field device of claim 12, wherein the primary part is connected to the secondary part via the signal line and the return line, the signal line and the return line each including a first line segment, a second line segment and a connector releasably connecting the first line segment to the second line segment.

* * * * *